March 25, 1969     A. B. BOWER, JR     3,434,554
CUTTER BIT FOR DRILLS
Filed March 8, 1967
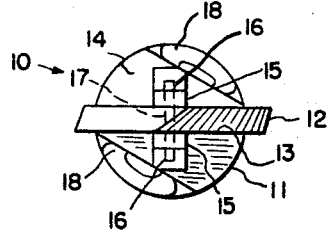
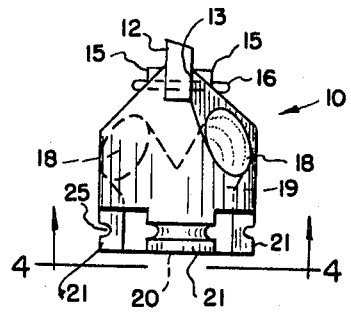
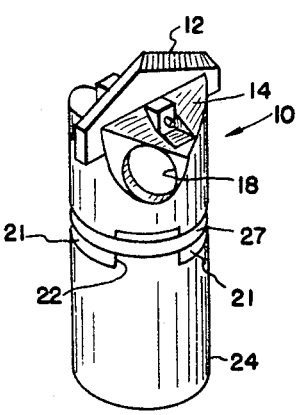
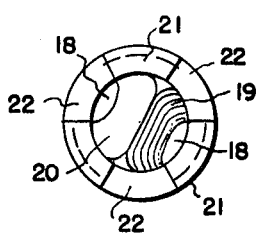
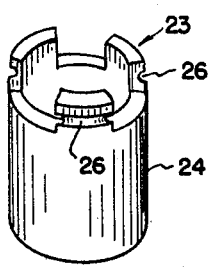
INVENTOR
ARNOLD B. BOWER, JR.
BY *Harold J. Holt*
ATTORNEY United States Patent Office 3,434,554
Patented Mar. 25, 1969

3,434,554
CUTTER BIT FOR DRILLS
Arnold B. Bower, Jr., St. Clair Shores, Mich., assignor to General Electric Company, a corporation of New York
Filed Mar. 8, 1967, Ser. No. 621,621
Int. Cl. E21c 13/01
U.S. Cl. 175—410                    3 Claims

ABSTRACT OF THE DISCLOSURE

A hollow, closed-top holder having a hard carbide cutter insert fastened to its upper end, with its lower end formed for releasably fastening to the upper end of a hollow, rotary drill shaft, and with openings formed in the holder, closely adjacent to its upper end below the insert, for passing fluid through the holder and drill shaft for thereby removing dust formed at the cutter insert.

Background of the invention

This invention relates to a cutter bit for drills, and particularly drills of the types used in roof drilling in mines. Conventional drills, such as those used for boring holes in the roofs of mine shafts for receiving roof bolts or explosive charges, generally comprise a long, hollow rotary drill rod whose lower end is connected to the source of power and whose upper end is provided with holder or socket to which is attached a solid, cast or forged cutter bit formed of a head to which is permanently attached a carbide insert. Since drilling in rock produces large quantities of dust and small chips, it is conventional to remove these by means of providing holes in the walls of the hollow drill rod beneath the cutter bit holder, and either drawing this foreign material into the rod using a vacuum pump to draw in the dust-laden air, or alternatively, pumping coolant liquid upwardly through the tube and out through the holes to thereby wash away the dust and chips.

Such fluid passages or openings formed in the upper end of the drill rod present a number of problems which have not been solved until the present invention. First, the openings are necessarily a considerable distance from the cutting edge of the cutter insert which is mounted on top of the solid holder, remote from these openings. Hence, the openings work somewhat inefficiently and dust and chips tend to pack around the upper end of the cutter bit. Second, these openings are extremely difficult to clean when they become plugged. Third, these openings tend to weaken the upper end of the drill rod, and when such upper end becomes damaged, as it does from time to time, it necessitates replacement of a long and relatively expensive drill rod.

An example of the above-described earlier construction is shown in Bower U.S. Patent 3,187,825, issued June 8, 1965, which discloses a cutter bit removably fastened to the end of the hollow drill rod and with the dust-collecting openings located in the upper end of the drill shaft, remote from the cutter bit.

Summary of the invention

In accordance with the present invention, the cutter bit holder is formed with a hollow interior, and the dust-collecting holes in the cutter bit are formed closely adjacent to, that is, closely beneath the carbide insert so that it is more nearly adjacent to the area in which the dust is formed for far more efficient dust collection. In addition, increased life of the larger, more expensive drill rod results. Moreover, with such construction the cutter bit holder may be easily replaced if and when the openings become damaged and may be easily removed for cleaning the opening.

In addition, the invention provides a rigid, durable cutter bit holder for support and retention of the cutter bit insert containing the dust-collecting holes and having a readily releasable fastening means for fastening it to the upper end of the tubular, hollow drill rod, thereby avoiding the need for openings in the drill rod itself.

Brief description of the drawing

The invention will be more clearly understood from the following description taken in connection with the accompanying drawing in which:

FIGURE 1 is a top plan view of the cutter bit of this invention;
FIGURE 2 is a front elevational view;
FIGURE 3 is a side elevational view;
FIGURE 4 is a bottom end view taken in the direction of arrows 4—4 of FIG. 3;
FIGURE 5 is a perspective view showing the cutter bit secured upon the upper end of a rotation drill shaft; and
FIGURE 6 is a perspective view of the upper end of the drill shaft with the cutter bit removed.

Description of the preferred embodiment

Referring to the drawings, the cutter bit 10 comprises a holder 11 to which is fastened a conventional hard, wear-resistant cutter insert 12, preferably formed out of suitable tungsten carbide or the like, in a plate-like form with an upper cutting edge. The cutter insert fits within a groove 13 formed transversely within the upper end 14 of the holder. Such upper end is multiply tapered downwardly away from the upper end of the groove and is provided with side bosses defining a portion of the side walls of the groove 13. Aligned holes in such bosses receive a pin 16 which extends through an opening 17 formed in the insert.

While the insert may be permanently secured within the groove, as by brazing or the like, it is preferable to so dimension the groove that the insert is slightly loose and to simultaneously use a pin 16 of a lesser diameter than the holes through which it passes, so that the insert is sufficiently loose to slide endwise a short distance for self centering.

At opposite sides of the tapered end portions, side openings 18 communicate with the hollow interior 19 of the holder. The lower end 20 of the holder is open, and the edge defining this lower end is formed with alternating tongues 21 and grooves 22 for interlocking with the tongue and grooved upper end 23 of a hollow, tubular, rotary drill rod or shaft 24. In that manner, the holder is interlocked with the upper end of the drill rod or shaft.

Additionally, peripheral grooves 25 are formed in the holder tongues 21 for alignment with similar grooves 26 formed in the drill rod or shaft tongues. When these peripheral grooves are aligned, a wire ring 27 is placed within them to thereby temporarily lock the holder upon the upper end of the drill rod. The wire ring may be formed of a piece of wire which is arranged within such grooves and with its ends simply twisted together to thereby form a ring.

The holder 11 is here illustrated as a hollow cylinder. However, it may of course take other configurations as, for example, that of an ellipse or square in transverse section. The word "tubular" is intended herein to encompass all such shapes. In addition, while the interlocking tongue and groove connection is described above, other suitable temporary locking means may be used in place thereof, provided they serve the function of releasably locking the holder to the end of the drill rod without increasing the bulk or size at the junction and, in addition, have sufficient strength to transmit the drill torque.

In operation, the drill operator secures the cutter bit holder to the upper end of the drill rod and then operates either the suction or the liquid flow means for removing the dust during the drilling operation. When the cutter insert becomes worn, the holder may be easily removed, if the insert is permanently secured thereto, and replaced with a new holder having a new insert. Where the insert is secured by a pin, as described above, the insert may be replaced without removing the holder.

Further, if and when the holder becomes damaged or the openings become plugged, the holder may be easily removed and either replaced or cleaned, as may be necessary.

I claim:

1. A cutter bit for roof drilling and dust collection comprising:
   a tubular holder having an open lower end,
   an upwardly opening groove formed transversely of the holder upper end, and a plate-like, hard carbide insert fitted within said groove and extending outwardly therefrom to form a cutting edge,
   said upper end tapering downwardly and outwardly from the groove on both sides of the holder,
   at least two openings formed in the wall of the holder beneath said groove and extending inwardly in open communication with the hollow interior of the holder, the mouths of each of said openings being formed in the tapered portions of said upper end diametrically opposite each other and closely adjacent the hard carbide insert, said openings together with said hollow interior of the holder forming a relatively large unobstructed passageway from the exterior of the holder to the open lower end thereof,
   means formed on said lower end for removably fastening said holder to and coaxially with a hollow tubular rotary drill shaft without increasing the bulk at the junction of the holder and drill shaft,
   whereby fluid may freely pass through said opening, holder and drill shaft for removing dust formed at the insert during drilling.

2. A cutter bit as defined in claim 1, said insert being loosely fastened within said groove by means of a pin extending loosely and transversely through aligned openings formed in the insert and the opposite side walls defining said groove.

3. A cutter bit as defined in claim 1, said means for fastening the holder comprising downwardly and axially extending, spaced-apart tongues for fitting into receiving grooves formed in the upper end of said drill shaft, and peripheral grooves formed in the outer walls of said tongues for receiving a removable wire ring arranged to engage with said drill shaft.

References Cited

UNITED STATES PATENTS

| 1,318,958 | 10/1919 | Bernay | 175—413 X |
| 2,521,791 | 9/1950 | Harrington | 175—411 |
| 2,575,239 | 11/1951 | Stevens | 175—418 X |
| 2,597,771 | 5/1952 | Bergstrom | 175—417 X |
| 2,969,846 | 1/1961 | Sandvig | 175—418 |
| 3,032,129 | 5/1962 | Fletcher et al. | 175—410 X |

CHARLES E. O'CONNELL, *Primary Examiner.*

RICHARD E. FAVREAU, *Assistant Examiner.*

U.S. Cl. X.R.

175—418